United States Patent
Satoh et al.

(10) Patent No.: US 7,491,467 B2
(45) Date of Patent: Feb. 17, 2009

(54) NEGATIVE ELECTRODE FOR NONAQUEOUS ELECTROLYTE SECONDARY BATTERY AND NONAQUEOUS ELECTROLYTE SECONDARY BATTERY USING THE SAME

(75) Inventors: Hideharu Satoh, Ibaraki (JP); Masakazu Yokomizo, Ibaraki (JP); Tadashi Ishihara, Tokyo (JP)

(73) Assignee: Mitsubishi Chemical Corporation, Tokyo (JP)

(*) Notice: Subject to any disclaimer, the term of this patent is extended or adjusted under 35 U.S.C. 154(b) by 124 days.

(21) Appl. No.: 11/017,821

(22) Filed: Dec. 22, 2004

(65) Prior Publication Data
US 2005/0191550 A1    Sep. 1, 2005

Related U.S. Application Data

(63) Continuation of application No. PCT/JP03/16196, filed on Dec. 17, 2003.

(30) Foreign Application Priority Data
Dec. 17, 2002   (JP)   ............... 2002-365351

(51) Int. Cl.
   *H01M 4/58*   (2006.01)
   *H01M 4/62*   (2006.01)

(52) U.S. Cl. ............... 429/217; 429/231.8; 429/218.1

(58) Field of Classification Search ............... None
See application file for complete search history.

(56) References Cited

U.S. PATENT DOCUMENTS

| | | | |
|---|---|---|---|
| 6,040,092 A * | 3/2000 | Yamada et al. | 429/331 |
| 6,475,670 B1 | 11/2002 | Ito | |
| 6,482,547 B1 * | 11/2002 | Yoon et al. | 429/231.8 |
| 6,638,662 B2 * | 10/2003 | Kaneda et al. | 429/231.8 |
| 6,783,890 B2 * | 8/2004 | Kweon et al. | 429/218.1 |
| 7,005,211 B2 * | 2/2006 | Kim et al. | 429/217 |
| 2002/0055041 A1 * | 5/2002 | Kobayashi et al. | 429/221 |
| 2002/0160266 A1 * | 10/2002 | Yamazaki et al. | 429/231.8 |
| 2002/0164479 A1 | 11/2002 | Matsubara et al. | |
| 2002/0172868 A1 | 11/2002 | Manna et al. | |
| 2003/0054253 A1 * | 3/2003 | Morishima et al. | 429/231.95 |
| 2004/0043293 A1 * | 3/2004 | Nagata et al. | 429/231.8 |

FOREIGN PATENT DOCUMENTS

| | | |
|---|---|---|
| EP | 0 778 630 A1 | 6/1997 |
| EP | 0 874 410 A2 | 10/1998 |
| JP | 57-208079 | 12/1982 |
| JP | 4-206168 | 7/1992 |
| JP | 10-21913 | 1/1998 |
| JP | 10-188957 | 7/1998 |
| JP | 11-329435 | 11/1999 |
| JP | 11-329436 | 11/1999 |
| JP | 2000-90916 | 3/2000 |
| JP | 2001-6737 | 1/2001 |
| JP | 2003-249210 | 9/2003 |
| JP | 2003-249219 | 9/2003 |

OTHER PUBLICATIONS

Machine translation of JP 2003-249219, Sep. 2003.*

* cited by examiner

*Primary Examiner*—Jonathan Crepeau
(74) *Attorney, Agent, or Firm*—Oblon, Spivak, McClelland, Maier & Neustadt, P.C.

(57) ABSTRACT

A negative electrode for a nonaqueous electrolyte secondary battery having a small surface film resistance and a high negative electrode strength, wherein the negative electrode includes a collector and an active material layer formed thereon, wherein the active material layer contains an active material and a binder composition, wherein the active material is a material in which metal oxide fine particles having an average particle diameter of 250 nm or less are attached to the surface thereof, and wherein the binder composition contains a binder having an olefinic unsaturated bond.

24 Claims, No Drawings

NEGATIVE ELECTRODE FOR NONAQUEOUS ELECTROLYTE SECONDARY BATTERY AND NONAQUEOUS ELECTROLYTE SECONDARY BATTERY USING THE SAME

FIELD OF THE INVENTION

The present invention relates to a negative electrode for a nonaqueous electrolyte secondary battery and a nonaqueous electrolyte secondary battery comprising the same.

BACKGROUND ART

Recently, a secondary battery having a high capacity has been desired with miniaturization of electronic devices. Therefore, a lithium ion secondary battery has attracted attention, which has an energy density higher than a nickel-cadmium battery and a nickel-metal-hydride battery.

As its negative active material, it is first attempted to use metallic lithium but it is revealed that dendrite lithium deposits during repeated charge and discharge and passes through a separator to reach a positive electrode, whereby there is a possibility to induce a firing accident through short circuit. Therefore, at present, it attracts attention to use, as the negative active material, a carbon material capable of intercalation and deintercalation of lithium ions between layers and prevention of deposition of metallic lithium in the process of charge and discharge.

As the carbon material, for example, use of graphite is described in Patent Literature 1. In particular, when graphite having a large graphitization degree is used as the negative active material for a lithium secondary battery, a capacity close to 372 mAh/g that is a theoretical capacity of graphite for lithium intercalation is obtained and thus the above graphite is known to be preferred as the active material. However, there exists a problem that graphite has a large irreversible capacity due to co-intercalation into planes of graphite layers when an electrolyte containing propylene carbonate (PC) as a solvent is used.

Under such circumstances, Patent Literature 2 describes that the co-intercalation is reduced or prevented by employing, as the carbon material for the negative electrode of a lithium secondary battery, a carbon material obtainable by treating carbon fine particles with a silane coupling agent and subsequently oxidizing the particles to form a silica thin film on the surface. At formation of a negative electrode with a negative active material, a binder is necessary. One of the most popular binders is polyvinylidene difluoride (PVDF). Also in the cited literature 2, a slurry obtained by mixing the active material and PVDF is applied onto a collector to form the negative electrode.

PVDF has a repeating unit represented by the following formula. Thanks to a characteristic that fluorine atoms are present in the main chain structure, it has a good flexibility and a good dispersibility of an active material and is also apt to attach onto a particle surface. Therefore, PVDF is highly practical in view of the applicability but there exist problems that strength of the active material layer after application and drying tends to be insufficient owing to its flexibility as shown in Comparative Example 2 to be described below and swelling in an electrolyte is large.

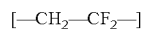

Furthermore, in recent years, as one approach to further improved high-performance battery, it is desired for the graphite material to be chargeable at a high current density but it is revealed that a conventional electrode having an active material layer composed of graphite and a binder is poor in this property. This is because the binder in the active material layer lowers a lithium-acceptability. Therefore, it may be considered to enhance the lithium-acceptability by reducing the binder content but this method weakens the strength of the active material layer at the same time. Particularly in a battery where the negative electrode is used by winding it together with a positive electrode and a separator, there arises a problem that the active material layer may exfoliate from the collector at an electrode winding process.

[Patent Literature 1]
JP-A-57-208079
[Patent Literature 2]
JP-A-11-329435

DISCLOSURE OF THE INVENTION

An object of the invention is to provide a negative electrode for a nonaqueous electrolyte secondary battery, which is chargeable at a high current density and has a large strength.

As a result of the extensive studies for solving the above problems, the present inventors have found that a negative electrode wherein an active material layer comprising an active material obtainable by attaching metal oxide fine particles, especially silica fine particles having an average particle diameter of 250 nm or less on the surface and a binder having an unsaturated bond has a large strength and is chargeable at a high current density because surface film resistance and charge transfer resistance are small at charging. Thus, they have accomplished the invention.

Namely, a gist of the invention lies in a negative electrode for a nonaqueous electrolyte secondary battery wherein an active material layer containing an active material and a binder is formed on a collector, the active material being a material in which metal oxide fine particles having an average particle diameter of 250 nm or less are attached to the surface and the binder being a binder having an olefinic unsaturated bond.

Moreover, another gist of the invention lies in a nonaqueous electrolyte secondary battery comprising the above negative electrode for a nonaqueous electrolyte secondary battery.

BEST MODE FOR CARRYING OUT THE INVENTION

The following will describe the invention in detail.

The negative active material is not particularly limited as far as it is a material capable of absorbing and releasing lithium ions. For example, use can be made of those selected from the group consisting of carbon materials having various graphitization degrees from graphite to amorphous one and metal particles capable of alloy formation with Li. Particularly preferred is graphite. When graphite is used as the active material in the invention, an improving effect on charging property at a high current density is remarkably larger than that in the cases of using other active materials.

Any of natural graphite and artificial graphite can be employed. Graphite is preferably graphite containing a small amount of impurities and is used after subjecting to various purification methods, if necessary. As graphite, it is preferred to use graphite having a large graphitization degree, where spacing (d002) at (002) face determined by an X-ray wide-angle diffraction method is less than 3.37 angstrom.

Specific examples of artificial graphite include those obtained by graphitizing organic materials such as coal tar pitches, coal heavy oils, atmospheric pressure residual oils, petroleum heavy oils, aromatic hydrocarbons, nitrogen-containing cyclic compounds, sulfur-containing cyclic compounds, polyphenylene, polyvinyl chloride, polyvinyl alcohol, polyacrylonitrile, polyvinyl butyral, natural polymers, polyphenylene sulfide, polyphenylene oxide, furfuryl alcohol resins, phenol-formaldehyde resins, and imide resins usually at a baking temperature of 2500 to 3200° C.

Moreover, as a carbon material having a small graphitization degree, use is made of a material obtained by baking an organic material usually at a temperature of 2500° C. or lower. Specific examples of the organic material include coal heavy oils such as coal tar pitches and dry distilled liquefied oils; straight-run heavy oils such as atmospheric pressure residual oils and reduced pressure residual oils; petroleum heavy oils, e.g., pyrolytic heavy oils such as ethylene tars formed as by-products at thermal cracking of crude oils, naphtha, and the like; aromatic hydrocarbons such as acenaphthylene, decacyclene, and anthrathene; nitrogen-containing cyclic compounds such as phenazine and acridine; sulfur-containing cyclic compounds such as thiophene; aliphatic cyclic compounds such as adamantane; thermoplastic polymers, e.g., polyphenylenes such as biphenyl and terphenyl, polyvinyl esters such as polyvinyl chloride, polyvinyl acetate, and polyvinylbutyral, and polyvinyl alcohol; and the like.

The baking temperature is usually 600° C. or higher, preferably 900° C. or higher, more preferably 950° C. or higher, and its upper limit varies depending on the desired graphitization degree of the carbon material but is usually 2500° C. or lower. The organic material is mostly baked at 2000° C. or lower, particularly at 1400° C. or lower. At the baking, the organic material may be mixed with an acid such as phosphoric acid, boric acid, or hydrochloric acid, or an alkali such as sodium hydroxide.

These carbon materials including graphite have an average particle diameter of usually 35 µm or less, preferably 25 µm or less, most preferably 18 µm or less, and usually 5 µm or more. In this connection, the carbon material having crystallinity poorer than that of graphite may be a secondary particle wherein a plurality of particles are aggregated. In this case, the average particle diameter of the secondary particle is preferably in the above range and the average particle diameter of the primary particle is usually 15 µm or less. When the particle diameter is too small, specific surface area increases and hence reactive surface with electrolyte increases, which tends to enhance irreversible capacity. Moreover, the amount of the binder to be absorbed within pores of the active material increases and the advantages of the invention are hardly exhibited. Contrarily, when the particle diameter is too large, it becomes difficult to form an active material layer having a homogeneous film thickness owing to occurrence of so-called streaking by a large mass at application of slurry of the active material and the binder onto a collector.

One of the preferred active materials to be used in the invention is a material obtained by coating at least part of the surface of graphite having the above high graphitization degree with the above carbon material having a graphitization degree smaller than the above one. The material can be obtained by coating the surface of graphite having a high graphitization degree with the above coal tar pitch or any heavy oil and subsequently baking it to carbonize the organic material used for coating. The ratio of graphite to the total of nuclear graphite and surrounding carbon material having a small crystallinity in such a bilayer-structure carbon material is preferably 80% or more, particularly 85% or more in order to enlarge negative electrode capacity. However, when the ratio is too large, the coating effect decreases, so that the ratio is preferably 99% or less, particularly 98% or less. The most preferred ratio of the nuclear graphite to the surrounding coating is from 85/15 to 95/5.

As the metal particles capable of alloy formation with Li, any hitherto known one can be employed but, in view of the capacity and cycle life, a metal selected from the group consisting of Si, Sn, As, Sb, Al, Zn, and W is preferred. Moreover, an alloy composed of two or more metals may be also employed and examples thereof include ionic metal alloys such as SnSb and SnAs, layer-structure alloys such as $NiSi_2$ and $CuSi_2$. In addition, a metallic element inactive toward Li, such as Cu, Ni, Ti, or Fe may be incorporated for retention of conductivity. The surface of the metal particles may be etched with an acidic or alkaline solvent.

The average particle diameter of the primary particle of the metal particles capable of alloy formation with Li is usually 1 µm or less, preferably 500 nm or less, more preferably 250 nm or less, and usually 1 nm or more in view of cycle life. The average particle diameter of the secondary particle is usually 100 µm or less, preferably 35 µm or less, more preferably 25 µm or less, and usually 5 µm or more, preferably 10 µm or more in view of easy handling at the formation of the active material layer, safety, and irreversible capacity.

These active materials may be used solely or as a mixture of two or more of them, but it is preferred to use graphite as at least part of the active material in view of suppression of deterioration of cycle capacity with time.

Embodiments of combining the metal particles capable of alloy formation with Li, graphite, and the carbon material having a graphitization degree smaller than that of graphite specifically include an embodiment wherein the three components are simply mixed in a particle state, an embodiment wherein the metal particles capable of alloy formation with Li are attached to the surface of graphite and the resulting one is coated at least partially with the carbon material having a graphitization degree smaller than that of graphite, an embodiment wherein the metal particles capable of alloy formation with Li are coated with the carbon material having a graphitization degree smaller than that of graphite and the resulting particles are mixed with graphite, and the like embodiments.

The mixing ratio of the metal particles capable of alloy formation with Li, graphite, and the carbon material having a graphitization degree smaller than that of graphite is preferably 20 to 70%/30 to 80%/0 to 30%, particularly, 30 to 40%/60 to 70%/1 to 30% in view of exhibited irreversible capacity and cycle life. Moreover, in particular, the weight ratio of graphite to the metal particles capable of alloy formation with Li is suitably selected from 1/1 to 2/1, particularly from 1.5/1 to 2/1 in view of cycle life.

As the metal oxide fine particles to be attached to the surface of the active material, fine particles of a metal oxide that does not chemically combine with Li may be employed. The use of a metal oxide that chemically combines with Li is not preferred since irreversible capacity generally increases although reversible capacity may increase in some cases. Examples of such metal oxides include oxides of single metal, such as silica ($SiO_2$), titania ($TiO_2$), zirconia ($ZrO_2$), alumina ($Al_2O_3$), copper oxides (CuO, $Cu_2O$), and nickel oxide (NiO); complex oxides such as aluminosilicate; and the like.

In particular, $SiO_2$ and $Al_2O_3$ are preferred since they show stable reaction in a high-frequency charge transfer region observed on AC impedance measurement and are considered to induce no chemical combination with Li.

Moreover, sol or gel obtained by modifying surface thereof can be also employed. Hydrolyzates of tetraethoxysilane can be also used. Of these, silica and alumina are preferably used owing to their inexpensiveness and availability, and particularly preferred is silica.

Silica may contain other metal oxide such as alumina, zirconia, or titania in a ratio of 40% or less of the total amount.

As silica, use can be made of ultrafine pulverized silica; ultrafine particulate anhydrous silica called fumed silica, silica fumed, silica aerosil, etc.; hollow porous silica; and the like. The ultrafine pulverized silica is obtained by pulverizing crystals of silicon dioxide such as quartz using a pulverizing apparatus such as micros or mechano micros. Fumed silica is obtained by burning purified $SiCl_4$ in the flame of oxygen and hydrogen. Fumed silica is preferably used since it does not require a pulverization step.

Any fumed silica having a hydrophilic or hydrophobic surface can be used. In general, hydrophilic one contains silanol groups, hydroxyl groups, or the like on the surface. Moreover, hydrophobic one is obtained by subjecting silica to methylation treatment, silicone treatment, or the like.

Fumed silica having a bulk density of 0.005 to 1.0 g/cc is preferably used as mentioned below.

As alumina, fumed alumina or the like can be used.

The average particle diameter of the metal oxide fine particles is 250 nm or less, preferably 120 nm or less, more preferably 50 nm or less. The average particle diameter of the metal oxide fine particles is usually 1 nm or more, preferably 5 nm or more. When the average particle diameter is too large, it is difficult to obtain homogeneous attachment to the negative active material. When it is too small, it becomes difficult to ravel out aggregated particles.

Moreover, suitably, the ratio of the average particle diameter of the metal oxide fine particles to the average particle diameter of the active material powder (ratio of average particle diameters of metal oxide/active material) is usually 1/20 or less, preferably 1/40 or less, particularly preferably 1/65 or less and usually 1/35000 or more, preferably 1/3500 or more, more preferably 1/1000 or more. When the ratio is too small, it becomes difficult to attach the metal oxide fine particles and also it becomes difficult to obtain an advantage of the invention that surface resistance reduces. On the other hand, when the ratio is too large, the attachment tends to be inhomogeneous.

The bulk density of the metal oxide fine particles is usually 0.001 g/cc or more, preferably 0.005 g/cc or more, more preferably 0.01 g/cc or more and usually 2.5 g/cc or less, preferably 1.0 g/cc or less, more preferably 0.5 g/cc or less, most preferably 0.05 g/cc or less. When the bulk density is too small, the particles are difficult to handle at powder mixing, and when it is too large, the particles are difficult to disperse.

The specific surface area of the metal oxide fine particles is not particularly limited but is usually 50 $m^2/g$ or more, preferably 100 $m^2/g$ or more, more preferably 200 $m^2/g$ or more and usually 1000 $m^2/g$ or less, preferably 500 $m^2/g$ or less, more preferably 400 $m^2/g$ or less as a value determined by BET method. When the specific surface area is too large, the particles is difficult to disperse and when the specific surface area is too small, the particles tend to be unevenly distributed.

The mixing ratio (weight ratio) of the metal oxide/active material varies depending on kinds of the active material and the metal oxide. In the case of graphite and the carbon material having a graphitization degree poorer than that of graphite, the ratio is usually 0.01/99.99 or more, preferably 0.1/99.9 or more, more preferably 0.8/99.2 or more and usually 20/80 or less, preferably 10/90 or less, more preferably 2/98 or less. Since most of the metal oxide is inactive in view of capacity, too large ratio of the metal oxide results in decrease of battery capacity and too small ratio does not afford sufficient advantages of the invention.

The attaching rate (coating rate by area) of the metal-oxide on the surface of the active material, which is confirmed by scanning electron microscopic (SEM) observation, is usually 90% or less, preferably 50% or less, more preferably 40% or less, further preferably 30% or less and usually 0.5% or more, preferably 5% or more. Too high attaching rate of the metal oxide is not preferred since the metal oxide itself is electrically insulator and hence it acts as a resistive component against permeation of Li into the active material.

As a method for attaching the metal oxide fine particles onto the surface of the active material, there may be mentioned a method of mixing the active material with the metal oxide fine particles. The method of mixing the active material with the metal oxide fine particles may be any of dry mixing or wet mixing.

As mixers to be used for the mixing, those capable of dispersing the oxide fine particles at a high speed, such as mechano fusion, hybridizer, angmill, mechano micros, micros, jet mill, and hybrid mixer, are preferred since they can reduce aggregation of the oxide fine particles.

In the case that the bulk density of the metal oxide fine particles is small and dry mixing is difficult to apply, wet mixing using a dispersing medium is preferred. As kinds of the dispersing media to be used in the wet mixing, water, organic solvents, and the like may be mentioned.

Water may contain an acid such as formic acid, acetic acid, trifluoroacetic acid, propionic acid, valeric acid, oxalic acid, benzoic acid, hydrochloric acid, hydrobromic acid, sulfuric acid, or hydrofluoric acid or a base such as ammonia or sodium hydroxide within the range where silica is not dissolved.

As the organic solvents, use can be made of organic solvents, e.g., alcohols such as methanol, ethanol, isopropanol, n-propanol, butanol, and phenol; glycols such as ethylene glycol and diethylene glycol; ethers such as diethyl ether; acetone; dimethoxyethane; esters such as propylene carbonate and ethylene carbonate heated to melting temperature or higher; nitrogen-containing organic solvents such as N-methylpyrrolidinone, N,N'-dimethylformamide, N,N'-dimethylacetamide, acetonitrile, pyridine, and quinoline; sulfur-containing organic solvents such as dimethyl sulfoxide and dimethyl sulfide; and phosphorus-containing organic solvents such as hexamethylphosphoramide; and kerosenes such as serogen, petroleums such as toluene, xylene, and benzene, or pitch-based organic solvents.

Of these, those selected from the group consisting of water, methanol, ethanol, isopropyl alcohol, butanol, N-methylpyrrolidinone, and acetonitrile are preferred since they have a relatively low boiling point and thus the active material to which the metal oxide fine particles have been attached can be dried easily and safely. In particular, when the metal oxide fine particles are composed of silica, an alcohol or water is preferred in the case that the surface is hydrophilic and an alcohol is preferred in the case that the surface is hydrophobic. Among the alcohols, preferred is ethanol that is easy to evaporate and recover.

After the wet mixing, evaporation of the dispersing medium affords an active material to which the metal oxide fine particles have been attached onto its surface. The drying temperature varies depending on the solvent used. Usually, after most of the dispersing medium used for the wet mixing is evaporated at a temperature slightly lower than the boiling temperature of the dispersing medium, the active material is dried usually at 100 to 350° C., preferably 100 to 150° C. in order to remove the dispersing medium and surface water of crystallization. Drying is carried out in an atmosphere of an inert gas such as nitrogen or argon, in the atmospheric air, or under reduced pressure.

The thus obtained active material to which the metal oxide fine particles have been attached onto its surface may be baked, if desired. The baking temperature is usually 1350° C. or lower.

The existing state of the metal oxide fine particles on the surface of the active material depends on the attaching method, but the metal oxide fine particles seem to exist mainly at the concave part of the surface of the active material particles. In addition to the site, depending on the attaching method of the metal oxide fine particles, there seems to be also a state wherein the metal oxide fine particles penetrate into the active material particles. Of course, there further exists a state wherein the metal oxide fine particles are simply attached onto the surface of the active material particles.

In this connection, the advantage can be expected even when the active material particles are added at a stage of kneading a slurry composed of the active material, the binder and water. In this case, the penetration of the metal fine particles into the active material is limited to some extent, but the function of the binder as a filler does act. In particular, since the processes of addition and evaporation of the dispersing medium can be omitted, this procedure is advantageous from the viewpoint of production process.

For example, it is considered that the metal oxide fine particles tend to penetrate into the active material at mechanical dry mixing such as mechano fusion or hybridizer, the metal oxide fine particles tend to attach onto the concave part of surface of the active material by wet mixing, and the use of a powder mixer such as a paint shaker, where only a weak shear is imparted between the particles, tends to result in a product wherein the metal oxide fine particles are simply attached onto the surface of the active material particles.

In the invention, a compound having an olefinic unsaturated bond in the molecule is used as the binder. The binders having an olefinic unsaturated bond in the molecule include a styrene-butadiene rubber, a styrene-isoprene-styrene rubber, an isoprene rubber, an acrylonitrile-butadiene rubber, a neoprene rubber, a butadiene rubber, an ethylene-propylene-diene copolymer, and the like. By using such a binder having an olefinic unsaturated bond, the swelling property of the active material layer in the electrolyte can be reduced. In particular, a styrene-butadiene rubber is preferably used.

By combined use of such a binder having an olefinic unsaturated bond and the above active material to which the metal oxide fine particles have been attached, strength of the negative electrode can be enhanced. When the strength of the negative electrode is high, deterioration of the negative electrode by charge and discharge is suppressed and cycle life can be extended. Moreover, in the negative electrode according to the invention, since adhesion strength between the active material layer and the collector is high, there does not arise a problem that the active material layer is peeled off the collector at production of the battery with winding the negative electrode even when the content of the binder in the active material layer is reduced.

The binder having an olefinic unsaturated bond in the molecule is desirably a binder having a large molecular weight, i.e., the molecular weight of usually 10,000 or more, preferably 50,000 or more and usually 1,000,000 or less, preferably 300,000 or less or a binder having a large ratio of the unsaturated bond, i.e., number of moles of the olefinic unsaturated bond per g of the total binders is $2.5 \times 10^{-7}$ or more, preferably $8 \times 10^{-7}$ or more and usually $1 \times 10^{-4}$ or less, preferably $5 \times 10^{-6}$ or less. In particular, a binder satisfying the above requirements on the molecular weight range and the ratio of the unsaturated bond simultaneously is more preferred. When the molecular weight of the binder having an olefinic unsaturated bond is too small, its mechanical strength is poor and when it is too large, its flexibility is poor. Moreover, when the ratio of the olefinic unsaturated bond in the binder is too small, the strength-enhancing effect is little and when the ratio is too large, the flexibility is poor.

In addition, the binder having an olefinic unsaturated bond desirably has unsaturation degree of usually 15% or more, preferably 20% or more, more preferably 40% or more and usually 90% or less, preferably 80% or less. In this connection, the unsaturation degree means the ratio (%) of double bonds to the repeating units of a polymer.

In the invention, a binder having no olefinic unsaturated bond can be used in combination with the binder having an olefinic unsaturated bond within the range where the advantages of the invention are not lost. The mixing ratio of the binder having no olefinic unsaturated bond to the binder having an olefinic unsaturated bond is usually 150% by weight or less, preferably 120% by weight. Applicability can be improved by using the binder having no olefinic unsaturated bond in combination, but when the amount is too large, the strength of the active material layer decreases.

The binders having no olefinic unsaturated bond include polysaccharide thickeners such as methyl cellulose, carboxymethyl cellulose, starch, carrageenan, pullulan, guar gum, and xanthan gum; polyethers such as polyethylene oxide and polypropylene oxide; vinyl alcohols such as polyvinyl alcohol and polyvinyl butyral; polyacids such as polyacrylic acid and polymethacrylic acid or metal salts of these polymers; fluorine-containing polymers such as polyvinylidene fluoride; alkane polymers such as polyethylene and polypropylene; and copolymers thereof.

In the invention, by the combined use of the above active material to which the metal oxide fine particles have been attached and the above binder having an olefinic unsaturated bond, the ratio of the binder in the active material layer can be reduced as compared with the conventional one. The weight ratio of the active material to which the metal oxide fine particles have been attached relative to the binder, which may be optionally a mixture of the binder having an olefinic unsaturated bond and the binder having no olefinic unsaturated bond as mentioned above, is in the range of usually 90/10 or more, preferably 95/5 or more and usually 99.9/0.1 or less, preferably 99.5/0.5 or less, more preferably 99/1 or less, as a dry weight ratio. Too high ratio of the binder is apt to invite reduction of capacity and increase of resistance and too low ratio of the binder results in poor negative electrode strength.

The negative electrode according to the invention is formed by dispersing the metal oxide fine particles and the binder having an olefinic unsaturated bond into a solvent to prepare a slurry and applying it onto a collector. As the solvent, an organic solvent such as an alcohol or water can be employed. If desired, a conductive agent may be added to the slurry. The conductive agents include carbon blacks such as acetylene black, ketjenblack, and furnace black, fine powders composed of Cu, Ni, or an alloy thereof having an average particle diameter of 1 μm or less, and the like. The adding amount of the conductive agent is usually about 10% by weight or less relative to the active material.

As the collector to which the slurry is applied, conventionally known one can be employed. Specifically, a metal thin film such as rolled copper foil, electrolytic copper foil, or stainless foil may be mentioned. The thickness of the collector is usually 5 μm or more, preferably 9 μm or less and usually 30 μm or less, preferably 20 μm or less.

After the slurry is applied onto the collector, the resulting one is dried at a temperature of usually 60 to 200° C., preferably 80 to 195° C. under a dry air or inert atmosphere to form an active material layer.

The thickness of the active material layer obtained by application of the slurry and drying is usually 5 μm or more, preferably 20 μm or more, more preferably 30 μm or more and usually 200 μm or less, preferably 100 μm or less, more preferably 75 μm or less. When the active material layer is too thin, it lacks in practicality as the negative electrode in view of the particle diameter of the active material. When it is too thick, it is difficult to obtain a sufficient performance of charge and discharge of Li for a high-density current value.

The negative electrode according to the invention exhibits a low surface film resistance and charge transfer resistance, and the active material layer has a high strength, i.e., a scratch strength of 800 g or more, particularly 900 g or more measured by the following method. In particular, in the case of using graphite as the negative active material, it is innovative that the above scratch strength reaches 800 g or more, particularly 900 g or more while the surface film resistance is 4 ohm or less.

(Measurement of Negative Electrode Strength)

The scratch strength of the negative electrode was measured on a pencil hardness tester manufactured by Toyo Seiki used in JIS K5400 using an SUS round bar having a diameter of 7 mm as a scratching rod instead of a pencil. The negative electrode to be used in the measurement is one obtained by applying the slurry on a collector and drying to form an active material layer and then pressing it at a line pressure of 20 to 300 kg/cm, and the electrode having a density of the active material layer of 1.0 to 1.8 g/cc and a thickness of the active material layer of 30 to 100 μm is used. The rod was applied at the angle of 45° relative to the electrode surface and the measuring method was in accordance with JIS K5400. The judgment of electrode scratch is evaluated by weight (g) of the weight that has been applied on the rod at the time when a scratch of 4.5 mm or more is visually confirmed on a copper foil collector when the electrode surface is scratched at a distance of 6 mm with the rod. An average value for 5 times measurement is determined as a measured value.

The reason why the advantage of the invention is obtained is not clear but is assumed as follows.

In the negative active electrode, concave parts and porous parts of the surface are considered to be active surfaces through which Li enters or exits. Hitherto, the binder mostly used for preparing the negative electrode penetrates into the concave parts and porous parts to inhibit smooth insertion and extraction of Li. In the invention, since the metal oxide fine particles penetrate into the concave parts and porous parts of the active material and further cover the surface of the active material, the binder does not come into direct contact with the active material to cover it. Moreover, it is presumed that there are appropriate voids through which the binder cannot pass but Li can pass among the metal oxide fine particles which have penetrated into the concave parts and porous parts of the negative active material and hence the surface reaction resistance may be reduced by the arrival of Li at the negative active surfaces with its free passage through the voids.

In addition, it is presumed that the strength of the negative electrode is enhanced by the fact that the binder, which hitherto penetrates into the concave parts and porous parts of the negative active material and hence does not contribute to the binding of the active material, is used for binding the active material and also the metal oxide fine particles present on the surface of the negative active material flow out into the slurry to act as a filler for the binder.

As mentioned above, in the case that the metal oxide fine particles are further added to the slurry composed of the negative active material and the binder by mixing, the action of the filler is remarkably observed by using an appropriate kneading method and apparatus. In particular, it is more preferred to add a solution wherein the metal oxide fine particles are separately stirred and mixed with an appropriate dispersing medium to release the secondary aggregation.

The negative electrode according to the invention is suitable for use as a negative electrode for a nonaqueous electrolyte secondary battery, especially a negative electrode for a nonaqueous electrolyte lithium secondary battery. The following will describe a lithium secondary battery using the negative electrode.

The basic constitution of the lithium secondary battery is the same as that of the hitherto known lithium secondary battery and usually a positive electrode and the negative electrode according to the invention are placed in a case through a porous membrane impregnated with a nonaqueous electrolyte. Therefore, the structure of the secondary battery according to the invention is not particularly limited and may be any of coin-type battery, cylindrical battery, and prismatic battery.

The positive active materials include metal chalcogen compounds capable of absorbing and releasing an alkali metal cation such as lithium ion during charge and discharge. The metal chalcogen compounds include transition metal oxides such as oxides of vanadium, oxides of molybdenum, oxides of manganese, oxides of chromium, oxides of titanium, and oxides of tungsten; transition metal sulfides such as sulfides of vanadium, sulfides of molybdenum, sulfides of titanium, and CuS; phosphorus-sulfur compounds such as $NiPS_3$ and $FePS_3$; transition metal selenium compounds such as $VSe_2$ and $NbSe_3$; transition metal complex oxides such as $Fe_{0.25}V0.75S_2$ and $Na_{0.1}CrS_2$; transition metal complex sulfides such as $LiCoS_2$ and $LiNiS_2$; and the like.

Of these, $V_2O_5$, $V_5O_{13}$, $VO_2$, $Cr_2O_5$, $MnO_2$, $TiO$, $MoV_2O_8$, $LiCoO_2$, $LiNiO_2$, $LiMn_2O_4$, $TiS_2$, $V_2S_5$, $Cr_{0.25}V_{0.75}S_2$, $Cr_{0.5}V_{0.5}S_2$, and the like are preferred, and particularly preferred are $LiCoO_2$, $LiNiO_2$, $LiMn_2O_4$, and lithium transition metal complex oxides wherein part of these transition metals are replaced with other metals.

These positive active materials may be used solely or a plurality of them may be used as a mixture.

As the binder for binding the positive active material, known one is used. Specifically, there are mentioned inorganic compounds such as silicate and water glass, resins having unsaturated bonds, resins having no unsaturated bond, and the like. Of these, preferred are the resins having no unsaturated bond. When a resin having an unsaturated bond is used as the resin for binding the positive active material, there is a risk that the resin is degraded at an oxidation reaction. The weight average molecular weight of these resins is usually 10,000 or more, preferably 100,000 or more and usually 3,000,000 or less, preferably 1,000,000 or less.

In the positive electrode, a conductive agent may be incorporated in order to enhance conductivity of the electrode. The conductive agent is not particularly limited as far as it imparts conductivity through addition of appropriate amount thereof to the active material and usually includes carbon powders such as acetylene black, carbon black, and graphite, fibers, powders, and foils of various metals, and the like.

The positive electrode is prepared by forming a slurry of the active material and the binder with a solvent, applying the slurry onto the collector, and drying it in a similar manner to the production of the negative electrode as mentioned above. As the collector for the positive electrode, aluminum, nickel, SUS or the like may be used.

The main components of the nonaqueous electrolyte are usually a lithium salt and a nonaqueous solvent dissolving the same.

As a nonaqueous system, the solvent to be used may be suitably selected from nonaqueous solvents hitherto proposed as solvents for nonaqueous electrolyte. Examples thereof further include linear carbonates such as ethylene carbonate, diethyl carbonate, dimethyl carbonate, and ethyl methyl carbonate, cyclic carbonates such as ethylene carbonate, propylene carbonate, and butylene carbonate, linear ethers such as 1,2-dimethoxyethane, cyclic ethers such as tetrahydrofuran, 2-methyltetrahydrofuran, sulfolane, and 1,3-dioxolane, linear esters such as methyl formate, methyl acetate, and methyl propionate, cyclic esters such as γ-butyrolactone and γ-valerolactone, and the like.

These nonaqueous solvents may be used solely or as a mixture of two or more of them. In the case that the negative active material is graphite to which the metal oxide fine particles have been attached, a combination of mixed solvent containing a cyclic carbonate and a linear carbonate is preferred.

The lithium salt is not particularly limited as far as it is known to be usable in this application and examples thereof include inorganic lithium salts, e.g., halides such as LiCl and LiBr, perhalogenate salts such as $LiClO_4$, $LiBrO_4$, and $LiClO_4$, inorganic fluoride salts such as $LiPF_6$, $LiBF_4$, and $LiAsF_6$, fluorine-containing organic lithium salts, e.g., perfluoroalkanesulfonate salts such as $LiCF_3SO_3$ and $LiC_4F_9SO_3$ and perfluoroalkanesulfonimides such as Li trifluorosulfonimide (($CF_3SO_2)_2NLi$), and the like. The lithium salts may be used solely or as a mixture of two or more of them.

The concentration of the lithium salt in the nonaqueous electrolyte is usually from about 0.5 to 2.0M.

As the nonaqueous electrolyte, an organic polymer compound may be incorporated into the electrolyte to be in a gel form, a rubber form, or a solid sheet form. Specific examples of the organic polymer compound include polyether polymer compounds such as polyethylene oxide and polypropylene oxide; crosslinked polymers of the polyether polymer compounds; vinyl alcohol polymer compounds such as polyvinyl alcohol and polyvinyl butyral; insolubilized products of the vinyl alcohol polymer compounds; polyepichlorohydrins; polyphosphazenes; polysiloxanes; vinyl polymer compounds such as polyvinylpyrrolidone, polyvinylidene carbonate, and polyacrylonitrile; polymer copolymers such as poly(ω-methoxyoligooxyethylene methacrylate) and poly(ω-methoxyoligooxyethylene methacrylate-co-methyl methacrylate), and the like.

The nonaqueous electrolyte may contain a film-forming agent. The film-forming agent includes carbonate compounds such as vinylene carbonate, vinyl ethyl carbonate, and methyl phenyl carbonate, alkene sulfides such as ethylene sulfide and propylene sulfide, sultone compounds such as 1,3-propanesultone 1,4-butanesulfone, acid anhydrides such as maleic anhydride and succinic anhydride, and the like. The content of the film-forming agent is usually 10% by weight or less, preferably 8% by weight or less, more preferably 5% by weight or less, most preferably 2% by weight or less. When the content of the film-forming agent is too large, there is a risk of adversely affecting other battery properties, such as increase of initial irreversible capacity and decrease of low-temperature properties and rate properties.

Moreover, as the nonaqueous electrolyte, a polymer solid electrolyte, which is a conductive material for an alkali metal cation such as lithium ion, can be also used. The polymer solid electrolyte includes those where a salt of Li is dissolved in the above polyether polymer compound, polymers where a polyether terminal hydroxyl group is replaced with an alkoxide, and the like.

Between the positive electrode and the negative electrode, a porous separator such as a porous film or a nonwoven fabric usually intervenes in order to prevent short circuit. In this case, the electrolyte is used for impregnation of a porous separator. As the material for the separator, a polyolefin such as polyethylene or polypropylene, polyether sulfone, or the like may be used, and preferred is a polyolefin.

EXAMPLES

The following will describe the invention in more detail with reference to Examples but the invention is not limited thereto.

Example 1

Two hundred grams of natural graphite from China (average particle diameter: 15 μm, specific surface area: 7.6 $m^2$/g), 2 g of fumed silica (reagent manufactured by Aldrich Inc., primary particle diameter (average particle diameter): 7 nm, bulk density: 0.039 g/cc), and 200 g of ethanol ("guaranteed grade" manufactured by Wako Pure Chemical Industries, Ltd.) were stirred in a homodisperser for 2 hours to mix them. The resulting mixture was placed in a stainless pad so that the height reached 1.5 cm, and was dried at 80° C. for 10 hours and subsequently at 110° C. for 2 hours in $N_2$ gas. The product was sieved and used as a fumed silica-attached active material. When its particle surface was observed by a scanning electron microscope (SEM), the attaching rate of the metal oxide on the active material was about 25%.

Ten grams of the resulting fumed silica-attached active material, 10 g of an aqueous dispersion of carboxymethyl cellulose (concentration of carboxymethyl cellulose: 1% by weight), and 0.2 g of an aqueous dispersion of styrene-butadiene rubber having an unsaturation degree of 75% (concentration of styrene-butadiene rubber: 50% by weight, molecular weight of styrene-butadiene rubber: 120,000) were mixed in a high-speed mixer to form a slurry. The slurry was applied onto a copper foil, dried, and pressed so that the weight of the active material layer after drying was 10 mg/$cm^2$, the density was 1.64 g/cc, and average electrode thickness was 68 μm, whereby a negative electrode was obtained. In this connection, number of moles of the olefinic double bond per g of the binder in the active material layer was $1 \times 10^{-6}$.

The electrode strength, electrode surface film resistance, and swelling rate of the resulting negative electrode were measured. The results were shown in Table 1.

Example 2

The same production method and the same evaluation procedures as in Example 1 were employed except that the fumed silica was replaced with fumed alumina. The results were shown in Table 1.

(Measurement of Negative Electrode Strength)

The scratch strength of the negative electrode was measured on a pencil hardness tester manufactured by Toyo Seiki used in JIS K5400 using an SUS round bar as a scratching rod instead of a pencil. The rod was applied at the angle of 45° relative to the electrode surface and the measuring method is in accordance with JIS K5400. The judgment of electrode scratch was evaluated by weight (g) of the weight that had been applied on the rod at the time when a scratch of 4.5 mm or more was visually confirmed on a copper foil collector when the electrode surface was scratched at a distance of 6 mm with the rod. An average value for 5 times measurement was represented as a measured value.

(Measurement of Electrode Surface Film Resistance)

Using a negative electrode, a nonaqueous electrolyte obtained by dissolving $LiPF_6$ in a concentration of 1 mole/liter in a nonaqueous solvent where ethylene carbonate and ethyl methyl carbonate were mixed in a ratio of 1:3 (weight ratio), a separator made of polyethylene, and a counter electrode composed of Li, they were combined with a negative electrode obtained by punching out to have an area of 1.23 $cm^3$, whereby two cells were prepared. After 3 cycles of charge and discharge, the cells were charged until charge capacity of the negative electrode reached 300 mAh/g at the fourth cycle. The two cells were dismounted and the negative electrode was taken out from each cell. A separator made of polyethylene impregnated with the above electrolyte was arranged between the two negative electrodes taken out to prepare a new cell and then surface film resistance thereof was measured at room temperature. The smaller this value is, the better the Li-accepting property is, that is, it means that charge is easy even at a high current value.

(Measurement of Swelling Rate of Negative Electrode)

The thickness of the negative electrode after 4 cycles of charge prepared in the same manner as above was measured on a micrometer manufactured by Mitsutoyo, and the swelling rate was determined according to the following equation, the thickness of the negative electrode before the cycles being 100%.

Swelling rate of negative electrode (%)={(thickness after charge−thickness before cycles)/thickness before cycles}×100

Since the swelling of the negative electrode mainly depends on electrodeposition of Li in this measuring method, the smaller this value is, the lesser the deposition of Li, that is, it means that the Li-accepting property is satisfactory.

COMPARATIVE EXAMPLE 1

A negative electrode was prepared in the same manner as in Example 1 except that fumed silica was not added, and the negative electrode strength, surface film resistance, and swelling rate of the negative electrode were measured. The results were shown in Table 1.

COMPARATIVE EXAMPLE 2

A negative electrode was prepared in the same manner as in Example 1 except that 52 g of an NMP dispersed solution of polyvinylidene fluoride (concentration of polyvinylidene fluoride: 12%) was used instead of the aqueous dispersion of styrene-butadiene rubber and carboxymethyl cellulose, and the negative electrode strength was measured. Since a sufficient strength of the negative electrode was not obtained, surface film resistance was not measured. The results were shown in Table 1.

Example 3

In a Loedige mixer having an inner volume of 130 liters, 30 kg of natural graphite (average particle diameter: 10 μm) from Sri Lanka and 6 kg of petroleum tar pitch were mixed to obtain a mixture of graphite powder and the petroleum tar pitch. It was placed in a heating furnace and the temperature was elevated to 1300° C. over a period of 4.5 hours under a nitrogen gas atmosphere and was maintained for 1 hour. Thereafter, it was cooled to room temperature to obtain a complex product having a coating layer of a carbon material having crystallinity poorer than that of graphite around the graphite. The product was pulverized to have an average particle diameter of 11 μm and a specific surface area of 3.4 $m^2/g$.

Using the resulting coated graphite that is a complex product of graphite and the carbon material instead of the graphite from China, a fumed silica-attached active material was obtained in the same manner as in Example 1. When the particle surface was observed by a scanning electron microscope, the attaching rate of the metal oxide on the active material was about 10%.

A negative electrode was prepared in the same manner as in Example 1 except that the fumed silica-attached active material was used and the density of the active material layer after drying was 1.36 g/cc and the average electrode thickness was 38 μm. Then, negative electrode strength and surface film resistance were measured. In this connection, in the measurement of the surface film resistance, the measurement was carried out at a charge capacity of the negative electrode at the fourth cycle of 120 mAh/g. The results were shown in Table 1.

Example 4

Without attaching fumed silica to the complex product of graphite and the carbon material obtained in the method of Example 3, fumed silica was added at the stage of mixing the binder composed of the aqueous dispersion of carboxymethyl cellulose (concentration of carboxymethyl cellulose: 1% by weight) and the aqueous dispersion of styrene-butadiene rubber having an unsaturation degree of 75% (concentration of styrene-butadiene rubber: 50% by weight, molecular weight of styrene-butadiene rubber: 120,000) of Example 1 and, after mixing in a Z-blade twin-screw kneader, the mixture was formed into a slurry. A negative electrode was prepared in the same manner as in Example 1 except that the fumed silica-added slurry was applied onto a copper foil and the density of the active material layer after drying was 1.36 g/cc and the average electrode thickness was 38 μm. Then, negative electrode strength and surface film resistance were measured. In this connection, in the measurement of the surface film resistance, the measurement was carried out at a charge capacity of the negative electrode at the fourth cycle of 120 mAh/g. The results were shown in Table 1.

COMPARATIVE EXAMPLE 3

A negative electrode was prepared in the same manner as in Example 3 except that fumed silica was not used, and negative electrode strength and surface film resistance were measured as in Example 2. The results were shown in Table 1.

TABLE 1

| | Kind of active material | Binder (weight ratio) | Presence of attachment of metal oxide | Negative electrode strength g | Surface film resistance (Ω/two electrodes) | Swelling rate of negative electrode (%) |
|---|---|---|---|---|---|---|
| Example 1 | Natural graphite | SBR:CMC = 1:1 | present (SiO$_2$) | 930 | 0.3 | 28 |
| Example 2 | Natural graphite | SBR:CMC = 1:1 | present (Al$_2$O$_3$) | 869 | 1.5 | — |
| Comparative Example 1 | Natural graphite | SBR:CMC = 1:1 | absent | 742 | 4.4 | 34 |
| Comparative Example 2 | Natural graphite | PVDF | present (SiO$_2$) | 451 | — | — |
| Example 3 | Coated graphite | SBR:CMC = 1:1 | present (SiO$_2$) | 1100 | 17 | — |
| Example 4 | Coated graphite | SBR:CMC = 1:1 | present (SiO$_2$ in slurry) | 384 | 18 | — |
| Comparative Example 3 | Coated graphite | SBR:CMC = 1:1 | absent | 194 | 24 | — |

In the table, SBR represents styrene-butadiene rubber, CMC represents carboxymethyl cellulose, and PVDF represents polyvinylidene fluoride.

In Table 1, with regard to the cases that natural graphite was used, the surface film resistance is large in Comparative Example 1 since metal oxide fine particles were not attached. In Comparative Example 2, since the binder does not have any olefinic unsaturated bond, the negative electrode strength is low. On the other hand, in Examples 1 and 2 wherein metal oxide fine particles were attached and a binder having an olefinic unsaturated bond is used, the negative electrode strength and surface film resistance are found to be excellent.

Moreover, Example 1 wherein metal oxide fine particles were attached shows a small swelling rate of the negative electrode and an excellent charge-accepting property as compared with Comparative Example 1 wherein metal oxide fine particles were not attached.

In Table 1, with regard to the cases that coated graphite is used, in Comparative Example 1, the negative electrode strength is low and the surface film resistance is large since metal oxide fine particles were not attached. On the other hand, in Examples 3 and 4 wherein metal oxide fine particles were attached, the negative electrode strength and surface film resistance are found to be excellent.

According to the invention, there can be provided a negative electrode for a nonaqueous electrolyte secondary battery having a small surface film resistance and a high negative electrode strength.

While the invention has been described in detail and with reference to specific examples thereof, it will be apparent to one skilled in the art that various changes and modifications can be made therein without departing from the spirit and scope thereof.

The present application is based on Japanese Patent Application No. 2002-365351 filed on Dec. 17, 2002, and the contents are incorporated herein by reference.

INDUSTRIAL APPLICABILITY

As mentioned in detail in the above, according to the negative electrode for a nonaqueous electrolyte secondary battery of the invention, a nonaqueous electrolyte secondary battery excellent in negative electrode strength and surface film resistance can be stably and efficiently produced.

The invention claimed is:

1. A negative electrode for a nonaqueous electrolyte secondary battery, wherein said negative electrode comprises a collector and a negative active material layer formed on a surface of said collector,
    wherein said negative active material layer comprises an active carbonaceous material and a binder composition,
    wherein said active carbonaceous material has metal oxide particles having an average particle diameter of less than or equal to 250 nm attached to a surface thereof,
    wherein said binder composition comprises a mixture of a binder having no olefinic unsaturated bond and a binder having no olefinic unsaturated bond, wherein said binder having no olefinic unsaturated bond is other than polyvinylidene difluoride, wherein a mixing ratio of said binder having no olefinic unsaturated bond to said binder having an olefinic unsaturated bond is less than or equal to 1.5,
    wherein a weight ratio of said active carbonaceous material having said metal oxide particles attached to said surface thereof to said binder composition is greater than 98/2 and less than or equal to 99.9/0.1, and
    wherein said metal oxide particles exhibit an attaching rate on said surface of said active carbonaceous material of from 0.5% to 90%.

2. The negative electrode according to claim 1, wherein said active carbonaceous material is a natural or artificial graphite having a large graphitization degree, where spacing (d002) at (002) face is less than 3.37 angstrom as determined by X-ray wide-angle diffraction.

3. The negative electrode according to claim 1, wherein said active carbonaceous material is a carbon material having a graphitization degree smaller than that of graphite, wherein said carbon material is obtained by baking an organic material at a temperature of from 600° C. to 2500° C., wherein said organic material is selected from coal heavy oils, straight-run heavy oils, petroleum heavy oils, aromatic hydrocarbons, cyclic compounds comprising nitrogen, cyclic compounds comprising sulfur, aliphatic cyclic compounds, polyvinyl esters, and thermoplastic polymers.

4. The negative electrode according to claim 1, wherein said active carbonaceous material is a coated graphite, which is obtained by coating at least part of a surface of a natural or artificial graphite with a carbon material having a graphitization degree smaller than that of graphite.

5. The negative electrode according to claim 4, wherein a weight ratio of said natural or artificial graphite to said carbon material is from 85/15 to 95/5.

6. The negative electrode according to claim 1, wherein said active carbonaceous material has an average particle diameter of from 5 μm to 35 μm.

7. The negative electrode according to claim 1, wherein said metal oxide particles do not chemically combine with lithium and are selected from the group consisting of alumina ($Al_2O_3$), cupric oxide (CuO), cuprous oxide ($Cu_2O$), nickel oxide (NiO), silica ($SiO_2$), titania ($TiO_2$), zirconia ($ZrO_2$), and aluminosilicate ($3Al_2O_3.2SiO_2$).

8. The negative electrode according to claim 1, wherein said metal oxide particles are alumina ($Al_2O_3$) particles.

9. The negative electrode according to claim 1, wherein said metal oxide particles are silica ($SiO_2$) particles.

10. The negative electrode according to claim 1, wherein said metal oxide particles have a bulk density of from 0.005 g/cc to 1.0 g/cc.

11. The negative electrode according to claim 1, wherein said metal oxide particles are fumed silica ($SiO_2$) particles having a bulk density of from 0.005 g/cc to 1.0 g/cc.

12. The negative electrode according to claim 1, wherein said metal oxide particles have an average particle diameter of from 1 nm to 250 nm.

13. The negative electrode according to claim 1, wherein said metal oxide particles have a specific surface area of from 50 $m^2$/g to 1000 $m^2$/g as determined by BET.

14. The negative electrode according to claim 1, wherein a ratio of an average particle diameter of said metal oxide particles to an average particle diameter of said active carbonaceous material is from 1/3500 to 1/40.

15. The negative electrode according to claim 1, wherein a weight ratio of said metal oxide particles to said active carbonaceous material is from 0.01/99.99 to 20/80.

16. The negative electrode according to claim 1, wherein said binder having an olefinic unsaturated bond has a molecular weight of from 10,000 to 1,000,000 or the number of moles of said olefinic unsaturated bond per gram of said binder is from $2.5 \times 10^{-7}$ to $1 \times 10^{-4}$.

17. The negative electrode according to claim 1, wherein said binder having an olefinic unsaturated bond has an unsaturation degree of from 15% to 90%.

18. The negative electrode according to claim 1, wherein said binder having an olefinic unsaturated bond is selected from the group consisting of a styrene-butadiene rubber, a styrene-isoprene-styrene rubber, an isoprene rubber, an acrylonitrile-butadiene rubber, a neoprene rubber, a butadiene rubber, and an ethylene-propylene-diene copolymer.

19. The negative electrode according to claim 1, wherein said binder having an olefinic unsaturated bond is a styrene-butadiene rubber.

20. The negative electrode according to claim 1, wherein said binder having no olefinic unsaturated bond is selected from the group consisting of a polysaccharide, a polyether, a vinylic alcohol, a polyacid or a metal salt thereof, a fluorinated polymer other than polyvinylidene difluoride, an alkane polymer, and copolymers thereof.

21. The negative electrode according to claim 1, wherein said binder having no olefinic unsaturated bond is selected from the group consisting of methyl cellulose, carboxymethyl cellulose, starch, carrageenan, pullulan, guar gum, xanthan gum, polyethylene oxide, polypropylene oxide, polyvinyl alcohol, polyvinyl butyral, polyacrylic acid or a metal salt thereof, polymethacrylic acid or a metal salt thereof, fluorinated polymers other than polyvinylidene difluoride, polyethylene, polypropylene, and copolymers thereof.

22. The negative electrode according to claim 1, wherein said binder having no olefinic unsaturated bond is carboxymethyl cellulose.

23. A nonaqueous electrolyte secondary battery comprising a nonaqueous electrolyte solvent, a positive electrode capable of absorbing and releasing lithium ions, and a negative electrode capable of absorbing and releasing lithium ions, wherein said negative electrode is the negative electrode according to claim 1.

24. The nonaqueous electrolyte secondary battery according to claim 23, wherein said nonaqueous electrolyte solvent is a mixed solvent comprising a cyclic carbonate and a linear carbonate.

* * * * *